United States Patent [19]

Gast

[11] 3,770,459

[45] Nov. 6, 1973

[54] PROCESS FOR PREPARING SKINLESS DRY SAUSAGE AND PRODUCT PRODUCED THEREBY

[75] Inventor: David Barend Gast, Kapellen, Belgium

[73] Assignee: Lever Brothers Company, New York, N.Y.

[22] Filed: Jan. 13, 1971

[21] Appl. No.: 106,065

[52] U.S. Cl. .................................. 426/8, 99/208
[51] Int. Cl. ........................................ A22c 11/00
[58] Field of Search .......................... 99/109, 208

[56] References Cited
UNITED STATES PATENTS
2,882,163  4/1959  Knaff ............................... 99/109
3,117,869  1/1964  Sims ................................ 99/109
3,170,797  2/1965  Sloan et al. ..................... 99/109
3,235,388  2/1966  Francis ............................ 99/109

OTHER PUBLICATIONS

"Refrigerating Engineering," February 1954, Page 46, Article Entitled Packaging and Wrapping Materials.

Primary Examiner—Hyman Lord
Attorney—Louis F. Kline, Jr., Melvin H. Kurtz and Edgar E. Ruff

[57] ABSTRACT

The invention relates to a novel food form comprising a skinless dry sausage having specified form weight, dimensions and water content. The invention also includes a process for making this skinless sausage wherein the sausage is subjected to defined humidity conditions prior to skinning it, and packages of such sausages in airtight containers, wherein the enclosed atmosphere has a low oxygen content.

2 Claims, 1 Drawing Figure

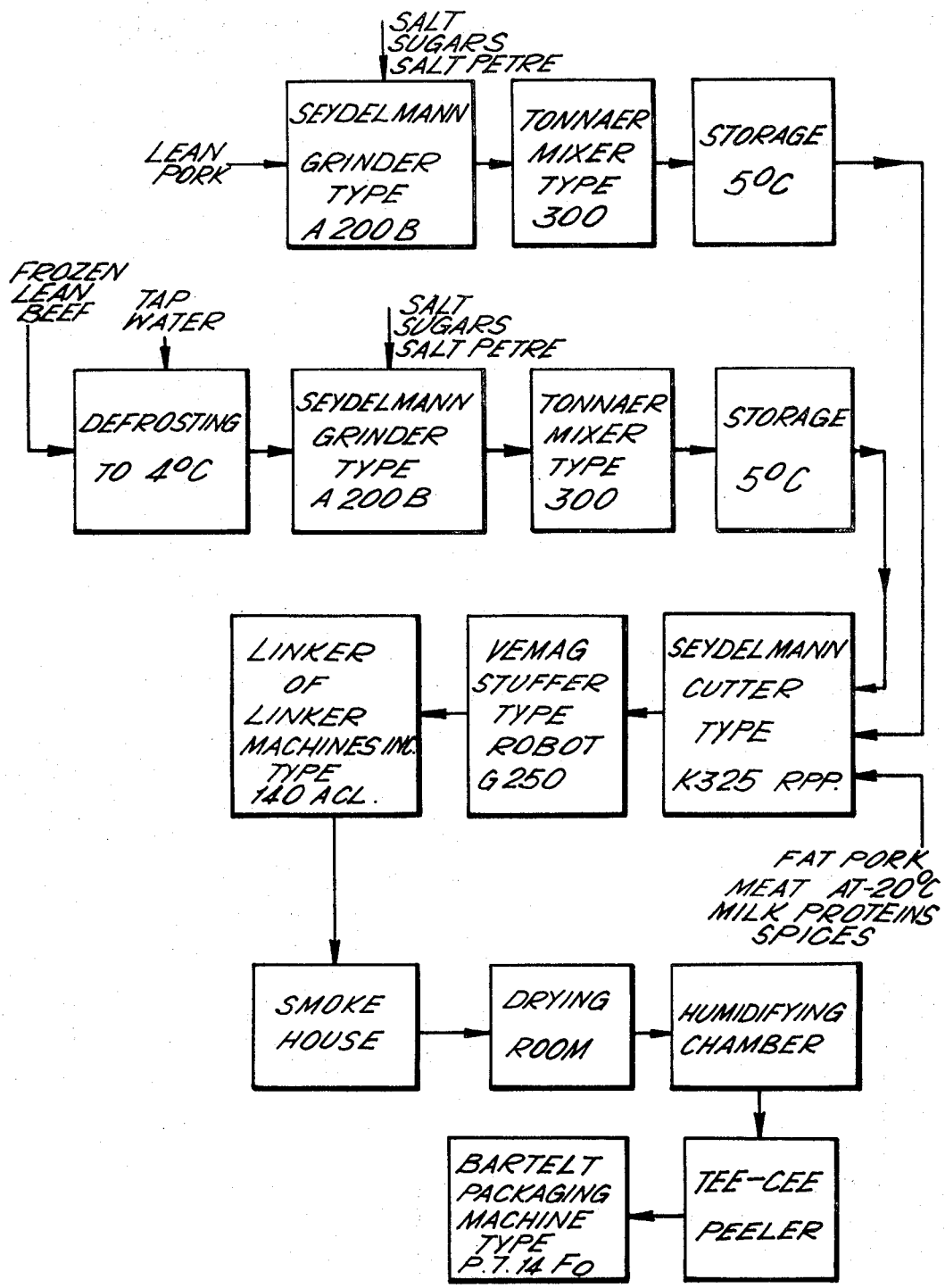

PROCESS FOR PREPARING SKINLESS DRY SAUSAGE AND PRODUCT PRODUCED THEREBY

This invention relates to dry sausage.

The present invention provides, as a novel food form, a dry sausage which is characterized by having a weight between 5 and 25 grams, preferably about 6 grams, a length between 3 and 15 centimetres, preferably about 3.5 centimetres, a full round section and being without a skin. The present invention also provides a process for making such a dry sausage.

Dry sausage is defined for the purposes of the present invention as one which comprises an uncooked mixture of meat, salt and spices and wherein preservation is effected at least in part by smoking, drying and the fermentative action of bacteria naturally present in the meat. These bacteria are typically the following:

Lacto bacillus:
Thermobacterum lactis
Thermobacterum acidophilus
Thermobacterium delbruckie
Streptobact. casei
Streptobact. plantarum
Streptobact. farciminus In addition bacteria such as
Betabacterium fermenti
Betabacterium brevis
Bacillus cersuis, Bacillus subtilis
Micrococcus caseolyticus-candidus are present and produce aromatising and flavouring substances. The final water content of the sausages of the present invention is less than 24 percent by weight.

Dry sausages can only be eaten after removal of the skin, since the skin is inedible or at least unpleasant in the mouth. Easy removal of the skin, e.g. by stripping with the fingers before eating, can only be achieved practically by having a sausage with a shrunken appearance, as opposed to a full round section, which shrunken appearance, is achieved by incompletely filling the sausage skin; such a sausage has, moreover, an unattractive appearance to the consumer in comparison with a sausage of full round section. In the case of a dry sausage of full round section, it is very difficult to remove the skin quickly and completely before consumption and hence the sausage of the present invention is skinned before packing. It has been found that this skinning can be satisfactorily achieved by increasing the water content of the skin, but not that of the sausage, by keeping it in a humidifying chamber for a period of 2 hours to 15 minutes at a relative humidity of 90 to 100 percent respectively, and at a temperature between 20° and 25°C, preferred humidifying conditions are described below. The foregoing considerations apply to any type of sausage skin, including those made from natural intestine, regenerated collagen or cellulosic material. Considerations of price and uniformity generally dictate the use of artificial sausage skins made from regenerated cellulose plasticized with glycerol.

The present invention thus also includes a process for making a dry sausage as defined above, which comprises stuffing a sausage skin with a dry sausage mixture to such an extent as to provide a sausage of full round section, smoking and drying the sausage and subsequently subjecting it to humidifying conditions which swell and/or soften the skin without substantially increasing the water content of the sausage and subsequently skinning the sausage. In order to obtain a sausage of full round section it is necessary to fill the sausage skins initially with a weight of sausage mixture which is about 50 percent more than the weight of the finished sausage, e.g. 9 grams of filling for a finished sausage weighing about 6 grams.

It has been found that the dry sausages of the present invention, when packed in air-tight containers with a reduced oxygen content, especially when packed in substantially oxygen-free nitrogen (oxygen content less than 1 percent by volume at STP Standard Temperature and Pressure) and with a volume ratio of gas (at STP) to sausage of less than 2, have a shelf-life of at least six months at 20°C.

Alternatively the sausage may be vacuum-packed at about 60 percent vacuum, i.e. in air at a pressure of about 300 mm. Hg.

Whichever method of packing is chosen, it has been found that bacterial action after packing reduces the oxygen content of the gas in the container to substantially zero in a relatively short time e.g. in about 7 days in the case of nitrogen packing as indicated above or about 23 days in the case of vacuum packing.

When the sausages of the present invention are packed in metal foil laminate pouches openable simply by tearing, as described in more detail below, they are attractive to the consumer as a "snack" item, i.e. a food form which can be eaten quickly without the use of a knife or any other particular equipment. When so packed, the sausages can conveniently be handled in coin-operated vending machines.

There is, moreover, a growing demand for foodstuffs in snack form, and one of the objects of the present invention is to provide meat in a snack form which has, moreover, good keeping qualities and is easily handled in coin-operated vending machines.

The present invention is further illustrated by the accompanying drawing and by the following specific example:

A sausage filling was prepared from the following (all precentages being by weight):

| | |
|---|---|
| Lean beef meat | 49% |
| Lean pork meat | 10% |
| Fat pork meat | 35% |
| Milk proteins | 1.5% |
| Sugars | 1.5% |
| Salt | 3% |
| Spices | 0.5% |
| Saltpetre | 0.02% |

The beef meat is frozen beef which is first defrosted in running tapwater and brought to a temperature of about 4°C. The lean pork and beef are "presalted" (i.e. caused to absorb preservatives) by grinding (in a Seydelmann grinder Type A200B) with the salt, sugar and saltpetre, mixing (in a Tonnaer mixer Type 300) and storing for 4 days at 5°C.

The presalted lean meat and the other components of the filling were then passed to a cutter (Seydelmann Type K 325 R.PP), which forms the sausage filling mixture. During this process the temperature of the filling components is maintained below −5°C. to avoid smearing of the fat. This temperature is generally maintained, at least in temperate zones, by the fact that the fat pork meat has a temperature of −20°C when added to the cutter. If conditions are such that the temperature of the mixture cannot be maintained below −5°C by relying on the low temperature of the fat pork meat, then additional steps must be taken to cool the presalted mixture. The resulting sausage filling mixture is then stuffed in a cellulosic casing (diameter 18 mm) with a length of 16.80 m by means of "Vemag" Stuffer (type Robot G 250) to give a sausage of full round section. The sausages are then tie-linked (in a linker Type 140 ACL) to give an individual sausage length of 3.5 cm and a weight of about 9 grams.

Therafter the lengths of sausages are suspended in a smoke house for a period of about 40 hours and during this time they are maintained at a temperature between 28°-30°C and subjected to wood smoke produced by burning 1.2 kg of wood (a 50/50 weight mixture of oak and birch) per cubic meter of smoke house. During this period the lactofermentative bacteria naturally present in the sausage filling mixture are active in producing lactic and acetic acid from the sugars present and lowering the pH to about 5.2.

The sausages are thereafter dried for 2 days at a temperature of 22°C and a relative humidity of 70 percent until their weight is about 6 grams and their water content is less than 24 percent by weight. The sausages next pass to a humidifying chamber, where they remain for about 20 minutes at a temperature of 20°-25°C and a relative humidity above 95 percent, as a result of which the cellulosic skin is swollen and softened without substantially altering the water content of the sausage mixture. Thereafter they were passed to a "Tee Cee" peeler which removes the skins, and packed either in tins at 60 percent vacuum with not more than 1 volume of air to 3 volumes of sausage or in aluminum foil-plastic laminate pouches in an atmosphere of nitrogen containing not more than 1% oxygen, in such a way that the enclosed volume of gas is less than twice the volume of the packed sausages. A heat sealable laminate made from sheets of cellophane (30 g/m²), aluminum (27 g/m²) and polyethylene (50 g/m²) has been found to be very suitable for making the pouches mentioned above, and packaging is conveniently performed by a Bartelt packaging machine Type P. 7 14 Fo. The pouches are formed with the polyethylene layer on the inside.

The relatively small size of sausages of the present invention renders it possible to smoke and dry them more rapidly than larger sausages and facilitates the maintenance of uniform quality.

It will be understood that the sausage filling components and their relative proportions given in the above specific example are not essential for the purposes of the present invention; for example, the proportion of lean beef may vary between 44–54 percent and the proportion of lean pork between 5–15 percent.

The lactic acid produced during fermentation has an effect on the protein fibres of the meat which imparts a firm stable structure to the sausage filling so that this can easily be handled and packed after the removal of the skin without any risk of disintegration.

What is claimed is:

1. A process for preparing dry sausage which comprises forming a dry sausage mixture from uncooked meat, salt and spices, stuffing a sausage skin with said dry sausage mixture to such an extent as to provide a sausage of full round section, smoking the resulting filled product for about 40 hours at a temperature of from 28°C to 30°C to promote the activity of lactofermentative bacteria naturally present in the sausage filling mixture to produce lactic acid whereby said lactic acid imparts a firm stable structure to the dry sausage mixture, drying the resulting filled product for a period of from about 120 minutes to about 15 minutes at an atmosphere of about 90 percent to 100 percent relative humidity respectively at a temperature between 20° and 25°C, and skinning the sausage.

2. A skinless dry sausage produced by the process claimed in claim 1.

* * * * *